US009579953B2

(12) United States Patent
Mercey et al.

(10) Patent No.: US 9,579,953 B2
(45) Date of Patent: Feb. 28, 2017

(54) AIR OUTLET DEVICE FOR MOTOR VEHICLE COMPRISING A DEFLECTOR

(75) Inventors: Nicolas Mercey, Mirepoix (FR); Rene-Louis Courtel, Dunkirk (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 1191 days.

(21) Appl. No.: 13/153,704

(22) Filed: Jun. 6, 2011

(65) Prior Publication Data

US 2012/0009861 A1 Jan. 12, 2012

(30) Foreign Application Priority Data

Jun. 4, 2010 (FR) .................................... 10 54406

(51) Int. Cl.
| | | |
|---|---|---|
| *B60H 1/24* | (2006.01) | |
| *B60H 1/34* | (2006.01) | |
| *F24F 13/10* | (2006.01) | |
| *F24F 13/15* | (2006.01) | |
| *B60K 37/00* | (2006.01) | |

(52) U.S. Cl.
CPC .................................. *B60H 1/3421* (2013.01)

(58) Field of Classification Search
CPC .......... B60H 1/34; B60H 1/24; B60H 1/3428; F16K 1/221
USPC ....... 454/155, 162, 320, 315, 143, 319, 152, 454/153, 284, 322, 330, 69; 165/41; 251/228
See application file for complete search history.

(56) References Cited

U.S. PATENT DOCUMENTS

| | | | | | |
|---|---|---|---|---|---|
| 3,190,206 | A | * | 6/1965 | Brueder | 454/155 |
| 3,224,194 | A | * | 12/1965 | De Feo Angelo | F01D 5/08 415/115 |
| 3,400,907 | A | * | 9/1968 | Horn et al. | 251/31 |
| 3,724,357 | A | * | 4/1973 | Kavthekar et al. | 454/152 |
| 3,843,090 | A | * | 10/1974 | Schneider et al. | 251/215 |
| 3,898,921 | A | * | 8/1975 | Trube et al. | 454/154 |

(Continued)

FOREIGN PATENT DOCUMENTS

| | | |
|---|---|---|
| DE | 4315220 | 5/1994 |
| DE | 19943822 | 3/2001 |

(Continued)

OTHER PUBLICATIONS

French search report dated Sep. 27, 2010 in corresponding FR 1054406.

*Primary Examiner* — Gregory Huson
*Assistant Examiner* — Eric Gorman
(74) *Attorney, Agent, or Firm* — Young & Thompson

(57) ABSTRACT

This device includes at least one peripheral wall (2, 6, 8) forming an air duct (4) and at least one first fin (10) rotatably mobile around a substantially longitudinal axis (A), at least one second fin (12) rotatably mobile around a substantially transverse axis (B), and at least one deflector (18) extending upstream of the second fin (12) and being rotatably mobile around a substantially transverse axis (C), the downstream end portion (20) of the deflector (18) being fastened to the upstream end portion (22) of the second fin (12) via a hinge (24). The axis of rotation (C) of the deflector (18) is mounted in at least one slot (28) of the peripheral wall (2, 6, 8), the slot (26) extending along a path at least partially not parallel to the upstream-downstream direction of the air duct (4).

18 Claims, 4 Drawing Sheets

(56) References Cited

U.S. PATENT DOCUMENTS

Figure 1:
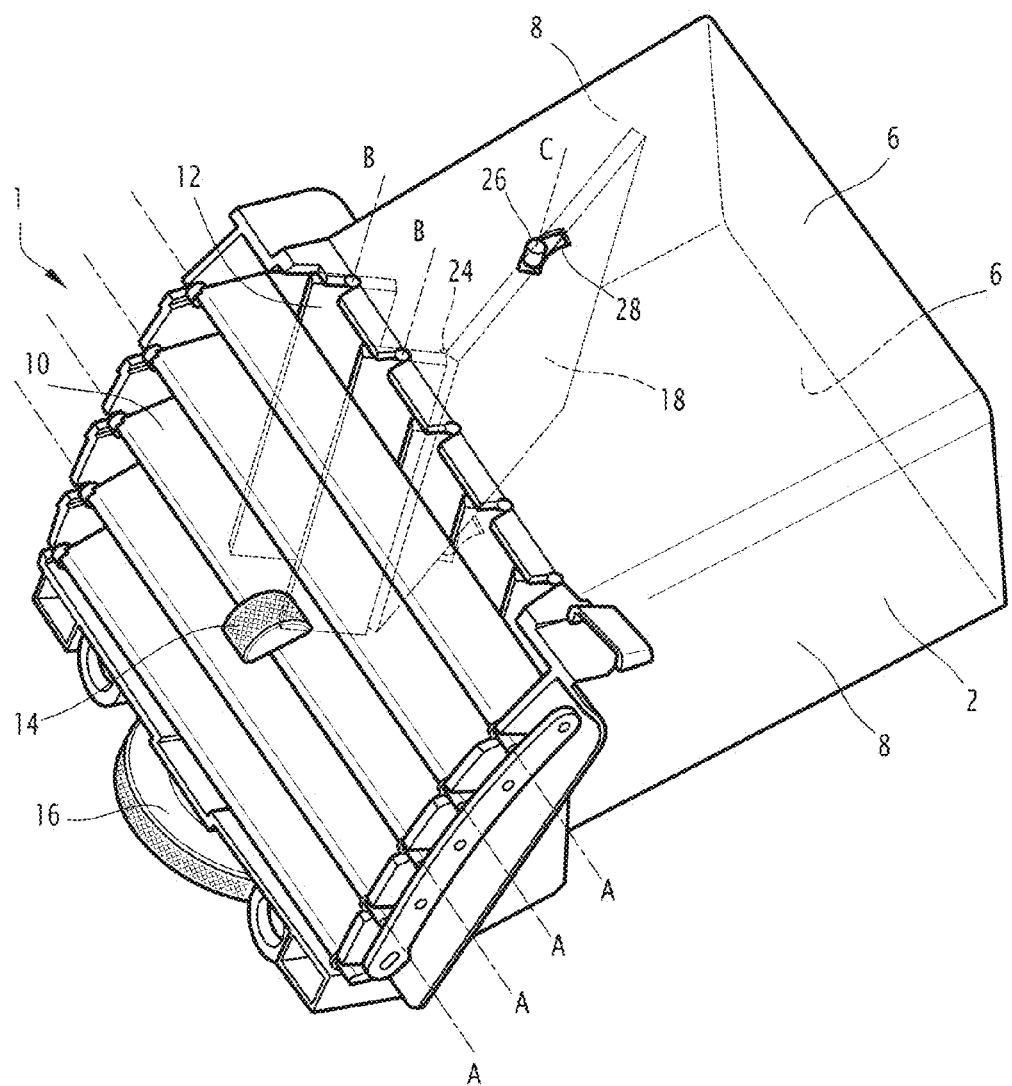

| | | | |
|---|---|---|---|
| 4,326,452 A * | 4/1982 | Nawa | F15D 1/08 137/829 |
| 4,515,208 A * | 5/1985 | Sakurai | B60H 1/00007 137/625.28 |
| 4,686,890 A * | 8/1987 | Stouffer et al. | 454/155 |
| 4,699,322 A * | 10/1987 | Jobst | 239/503 |
| 4,727,766 A * | 3/1988 | Cummings | 74/491 |
| 5,000,212 A * | 3/1991 | Tervo | 137/1 |
| 5,000,213 A * | 3/1991 | Tervo et al. | 137/1 |
| 5,056,420 A * | 10/1991 | Komori et al. | 454/155 |
| 5,230,654 A * | 7/1993 | Bloomer | 454/155 |
| 5,441,451 A * | 8/1995 | Jeung | F24F 13/1413 454/313 |
| 5,741,179 A * | 4/1998 | Sun et al. | 454/155 |
| 5,769,709 A * | 6/1998 | Kim | F24F 13/075 454/233 |
| 5,881,995 A * | 3/1999 | Tse et al. | 251/305 |
| 6,015,341 A * | 1/2000 | Faraj | 454/307 |
| 6,059,652 A * | 5/2000 | Terry et al. | 454/155 |
| 6,062,975 A * | 5/2000 | Knudtson | 454/138 |
| 6,066,040 A * | 5/2000 | Dauvergne | 454/152 |
| 6,135,879 A * | 10/2000 | Kohlbach et al. | 454/315 |
| 6,394,891 B1 * | 5/2002 | Arold | 454/155 |
| 6,443,831 B2 * | 9/2002 | Yabuya et al. | 454/155 |
| 6,533,655 B2 * | 3/2003 | Demerath et al. | 454/155 |
| 6,554,696 B2 * | 4/2003 | Kowalski | B60H 1/00742 454/155 |
| 6,589,110 B2 * | 7/2003 | Tanabe et al. | 454/155 |
| 6,607,434 B1 * | 8/2003 | Park | 454/155 |
| 6,609,389 B2 * | 8/2003 | Ozeki et al. | 62/244 |
| 6,736,719 B1 * | 5/2004 | Gehring et al. | 454/155 |
| 6,800,023 B2 * | 10/2004 | Demerath | 454/155 |
| 6,932,695 B1 * | 8/2005 | Zielinski et al. | 454/155 |
| 7,032,884 B2 * | 4/2006 | Horner et al. | 251/308 |
| 7,229,348 B2 * | 6/2007 | Shibata | 454/155 |
| 7,354,340 B2 * | 4/2008 | Mochizuki et al. | 454/152 |
| 7,472,699 B2 * | 1/2009 | Martin et al. | 126/285 R |
| 7,575,510 B2 * | 8/2009 | Kim | 454/155 |
| 7,887,400 B2 * | 2/2011 | Shibata et al. | 454/155 |
| 7,997,964 B2 * | 8/2011 | Gehring et al. | 454/155 |
| 8,382,564 B2 * | 2/2013 | Miki | 454/155 |
| 2004/0171344 A1* | 9/2004 | Krause | 454/315 |
| 2005/0245189 A1* | 11/2005 | Terai | B60H 1/3414 454/155 |
| 2006/0014485 A1* | 1/2006 | Sousa et al. | 454/315 |
| 2006/0157618 A1* | 7/2006 | Lee | B60H 1/3421 244/99.2 |
| 2006/0223430 A1* | 10/2006 | Shibata et al. | 454/155 |
| 2007/0123158 A1* | 5/2007 | Shibata et al. | 454/130 |
| 2008/0146139 A1* | 6/2008 | Terai | B60H 1/3421 454/155 |
| 2008/0182500 A1* | 7/2008 | Jessen et al. | 454/155 |
| 2009/0286462 A1* | 11/2009 | Goto | 454/155 |
| 2010/0261422 A1* | 10/2010 | Sakakibara | 454/155 |
| 2011/0237176 A1* | 9/2011 | Shibata et al. | 454/330 |
| 2013/0078900 A1* | 3/2013 | Zalan | B60H 1/3421 454/152 |
| 2013/0149952 A1* | 6/2013 | Demerath | B60H 1/3421 454/155 |
| 2013/0225058 A1* | 8/2013 | Ross | B60H 1/34 454/155 |
| 2014/0080399 A1* | 3/2014 | Takai | B60H 1/3421 454/155 |

FOREIGN PATENT DOCUMENTS

| | | | |
|---|---|---|---|
| DE | 102006032587 | 1/2008 | |
| EP | 1712384 A2 * | 10/2006 | |
| EP | 1810857 | 7/2007 | |
| JP | 2008001343 A * | 1/2008 | B60H 1/34 |
| WO | WO 2007136076 A1 * | 11/2007 | B60H 1/3414 |

* cited by examiner

AIR OUTLET DEVICE FOR MOTOR VEHICLE COMPRISING A DEFLECTOR

BACKGROUND OF THE INVENTION

Field of the Invention

The present invention relates to an air outlet device for a motor vehicle ventilation system, of the type comprising at least one peripheral wall forming an air duct and, near the downstream end of the air duct, at least one first fin, extending substantially longitudinally and being rotatably mobile around a substantially longitudinal axis, at least one second fin, extending substantially transversely and being rotatably mobile around a substantially transverse axis, and at least one deflector extending substantially transversely upstream of the second fin and being rotatably mobile around a substantially transverse axis, the downstream end portion of the deflector being fastened to the upstream end portion of the second fin via a hinge so that the rotation of the second fin in one direction drives the rotation of the deflector in the opposite direction.

Description of the Related Art

The invention also relates to a dashboard comprising such an air outlet device.

The ventilation system for the cab interior of a motor vehicle generally emerges in at least one opening provided in the dashboard of the vehicle. An air outlet device closes this opening and makes it possible to control the direction of the flow of air leaving the ventilation system.

Such an air outlet device for example comprises a first set of substantially horizontal fins and a second set of substantially vertical fins, the sets being rotatably mounted and extending one in front of the other across the downstream end portion of an air duct connecting the ventilation system to the air outlet orifice. Rotating the horizontal fins makes it possible to orient the flow of air upward or downward, and rotating the vertical fins makes it possible to orient the flow of air to the right or left.

In certain positions of the vertical fins, in particular an extreme position orienting the flow of air completely to the left or right, part of the air flow, bordering the wall of the air duct on the side where the flow of air is oriented, is not effectively oriented by the fins close to that wall. This part of the air flow exits without its orientation having been substantially changed by the fins. To increase the possibilities for orienting the flow of air, it is then provided to add a deflector upstream of the vertical fins and to connect said deflector to one of the vertical fins using a hinge so that the rotation of the vertical fins in one direction causes the deflector to rotate in the other direction. The deflector makes it possible to orient part of the flow of air upstream of the vertical fins so that that portion of the flow of air is correctly reoriented by the vertical fins in their extreme position.

However, this system still does not make it possible to orient the flow of air optimally, part of the flow of air still being likely not to be correctly reoriented in certain positions of the fins.

SUMMARY OF THE INVENTION

One of the aims of the invention is to offset these drawbacks by proposing an air outlet device making it possible to orient the exiting flow of air optimally in a manner that is simple and that offers a wide choice of air flow orientation profiles.

To that end, the invention relates to an air outlet device of the aforementioned type, in which the axis of rotation of the deflector is mounted in at least one slot of the peripheral wall, said slot extending along a path at least partially not parallel to the upstream-downstream direction of the air duct.

The slot of the peripheral wall makes it possible to modify the rotational movement kinematics of the deflector, which makes it possible to increase the air flow orientation possibilities as a function of the position of the fins depending on the choices made by an automobile manufacturer.

According to other features of the air outlet device:
the slot follows a path that is at least partially curved;
the slot comprises an upstream end portion and a downstream end portion, the upstream end portion extending upstream of the downstream end portion relative to the upstream-downstream direction of the air duct;
the slot has a semicircular shape whereof the end portions are arranged on a substantially longitudinal straight line;
the air outlet device comprises two longitudinal peripheral walls and two transverse peripheral walls defining the air duct between them, the first fin being mounted rotating between the two transverse peripheral walls, and the second fin and the deflector being mounted rotating between two longitudinal peripheral walls, said longitudinal peripheral walls each including a slot in which the axis of rotation of the deflector is mounted, said slots extending opposite each other;
the air outlet device comprises a plurality of first fins extending substantially longitudinally one above the other, said first fins being rotatably secured around substantially longitudinal axes;
the air outlet device comprises a plurality of second fins extending substantially transversely next to each other, said second fins being rotatably secured around substantially transverse axes, the downstream end portion of the deflector being fastened to the upstream end portion of one of said second fins;
the downstream end portion of the deflector is fastened to the upstream end portion of a second fin extending near one of the transverse peripheral walls;
a second fin is inserted between the transverse peripheral wall and the second fin whereof the upstream portion is fastened to the downstream end wall of the deflector; and
the upstream end portion of the deflector is arranged to bear against a transverse wall in an extreme position of the second fin so that the deflector plugs part of the air duct in that position.

The invention also relates to a dashboard comprising at least one air outlet opening, connected to a motor vehicle ventilation system, an air outlet device as described above being arranged in said opening so as to control the direction of the air flow leaving said ventilation system.

BRIEF DESCRIPTION OF THE DRAWING FIGURES

Figure 2:
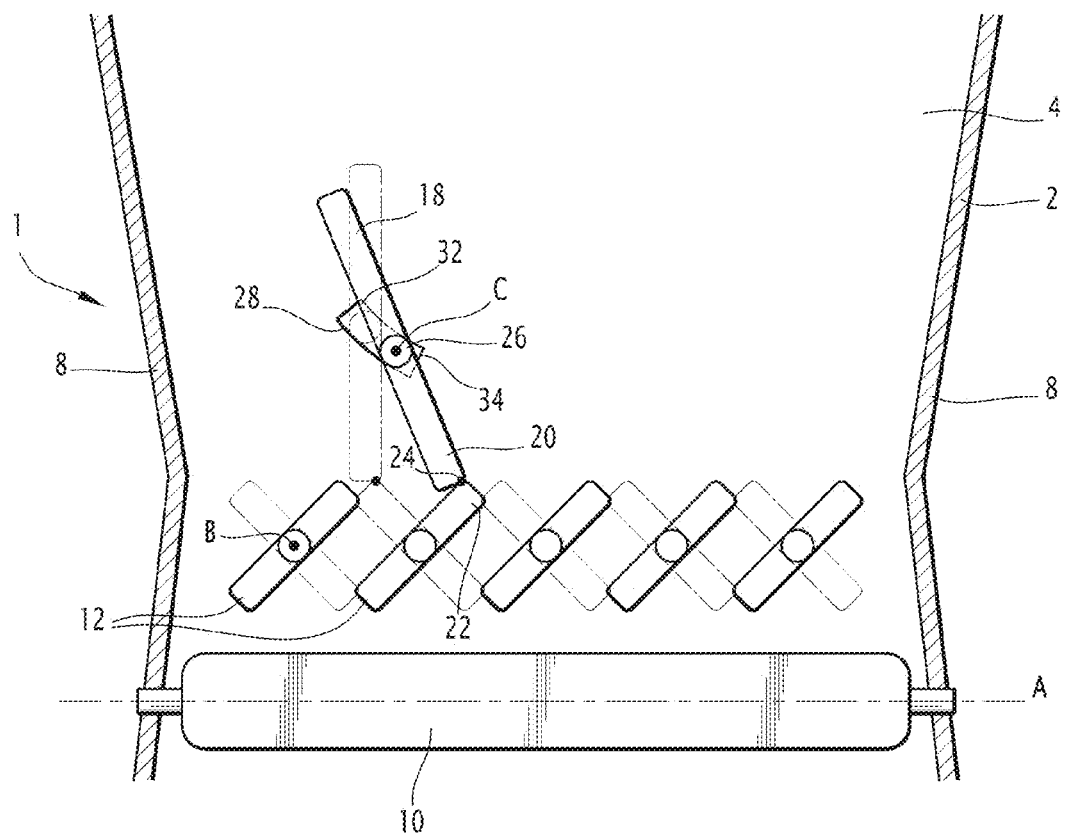
Figure 3:
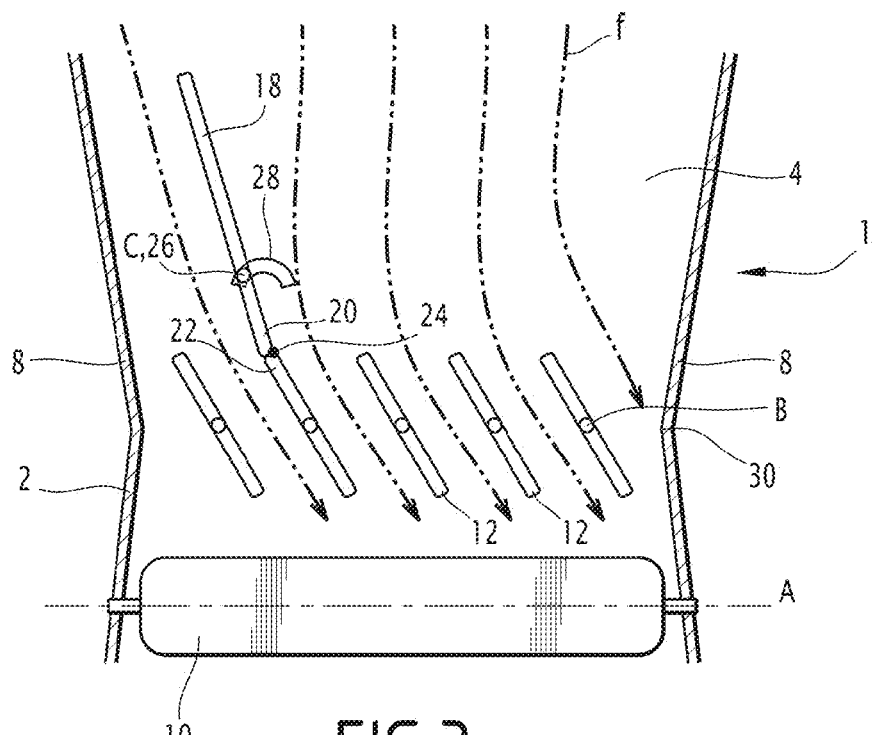

Other aspects and advantages of the invention will appear upon reading the following description, provided as an example and done in reference to the appended drawings, in which:

FIG. 1 is a diagrammatic perspective illustration of an air outlet device according to the invention, FIG. 2 is a diagrammatic cross-sectional illustration along a longitudinal plane of the air outlet device of FIG. 1, FIGS. 3 to 5 are diagrammatic cross-sectional illustrations along a longitudinal plane of air outlet devices according to different embodiments of the invention.

DETAILED DESCRIPTION OF THE INVENTION

In the description, the terms "upstream" and "downstream" are defined relative to the direction of the flow of air leaving through the air outlet device. The term "longitudinal" is defined along a plane in which the upstream-downstream direction extends, i.e. a substantially horizontal plane when the air outlet device is mounted. The term "transverse" is defined along a plane substantially perpendicular to the longitudinal plane, therefore a substantially vertical plane when the air outlet device is mounted.

In reference to FIG. 1, an air outlet device 1 is described for traditionally covering an air outlet opening provided in a dashboard (not shown) and connected to a ventilation system (not shown).

The device 1 comprises at least one peripheral wall 2 forming an air duct 4, intended to be connected to the ventilation system. According to the embodiment shown in FIG. 1, the device 1 comprises two longitudinal peripheral walls 6 and two transverse peripheral walls 8, fastened to each other so as to form the air duct 4, this duct then having a substantially rectangular section. According to other embodiments not shown, the air duct 4 has a substantially circular section and is formed by a single peripheral wall or another shape.

Traditionally, a set of first fins 10 extending longitudinally is rotatably mounted across the air duct 4, between the transverse walls 8. The first fins 10 are arranged one above the other so as to be distributed over the height of the duct 4. Each first fin 10 is able to move around a longitudinal axis A and the fins 10 are for example rotatably secured to each other, i.e. the rotation of a first fin 10 causes the other fins 10 to rotate. The set of first fins 10 extends near the downstream end of the duct 4, said downstream end being intended to emerge in the opening of the dashboard.

Also traditionally, the device comprises a set of second fins 12 extending transversely across the duct 4, between the longitudinal walls 6. The second fins 12 are rotatably mounted between the longitudinal walls 6. The second fins 12 are arranged next to each other so as to be distributed over the width of the duct 4. Each second fin 12 can move around a transverse axis B and the second fins 12 are for example rotatably secured to each other, i.e. the rotation of one second fin 12 causes the other second fins 12 to rotate. The set of second fins 12 extends upstream of the set of first fins 10.

The device 1 comprises a first actuator 14 arranged to control the rotation of the set of first fins 10 and a second actuator 16 arranged to control the rotation of the set of second fins 12. To that end, the first actuator 14 is for example a tab rotatably secured to a first fin 10 and the second actuator 16 is for example a wheel rotatably mobile around a transverse axis and driving the rotation of the second fins 12. According to one embodiment not shown, a single actuator drives the rotation of the first fins and second fins. In a known manner, this actuator is then rotatably secured to a first fin and translatably movable on said first fin, and comprises a connection with a second fin. Translating the actuator on the first fin causes the second fins to rotate.

In order to improve the directivity of the flow of air leaving the air duct 4, the device 1 also comprises a deflector 18 extending substantially transversely upstream of the second fins 12 and rotatably mobile around a substantially transverse axis C parallel to the axes of rotation B of the second fins 12. The deflector 18 is formed by an elongated wall extending substantially in the upstream-downstream direction. The downstream end portion 20 of the deflector 18 is connected to the upstream end portion 22 of one of the second fins 12, as shown in FIGS. 2 to 5. The connection between the downstream end portion 20 of the deflector 18 and the upstream end portion 22 of the second fin 12 is done by a hinge 24, for example a flexible hinge formed by a film of plastic material. The connection by the hinge 24 means that a rotational movement of the second fin 12 in one direction causes the deflector 18 to rotate in the opposite direction. FIG. 2 shows the second fins 12 in an extreme position, implying a certain position of the deflector 18, in solid lines, and the second fins 12 in the opposite direction, implying another position of the deflector 18, in dotted lines.

The deflector 18 makes it possible to locally alter the direction of the air flow encountering the wall of the deflector 18 by increasing the air flow reorientation capacity via some of the second fins 12. Indeed, without this deflector 18, part of the flow of air, in particular the part bordering one of the transverse walls 8, leaves the air outlet device without being deflected by the second fins 12, even in the extreme position oriented towards said transverse wall 8. The deflector 18 makes it possible to reorient part of the flow of air before it reaches the second fins 12, as shown by the arrows f in FIGS. 3 to 5, which makes it possible to ensure that the entire flow of air will be suitably reoriented upon leaving the air outlet device 1. The concerned part of the flow of air being somewhat close to a transverse wall 8, the downstream end portion 20 of the deflector 18 is fastened to the upstream end portion 22 of a second fin 12 extending near one of the transverse peripheral walls 8, as shown in FIGS. 2 to 5. According to one embodiment, only one second fin 12 is inserted between the transverse peripheral wall 8 and the second fin 12, the upstream end portion 22 of which is fastened to the downstream end portion 20 of the deflector 18.

The axis C of the deflector 18 comprises, at each of its end portions, a lug 26 fastened to the longitudinal wall 6 adjacent to said lug 26. More specifically, the lug 26 is arranged in a slot 28 formed in each longitudinal wall 6. The slots 28 of the longitudinal walls both have the same shape and extend parallel to and opposite each other. In this way, the slots 28 guide the translation of the deflector 18 in addition to its rotational movement when the second fin 12 to which the deflector 18 is attached rotates, as shown in FIG. 2. In this way, by altering the shape of the slots, it is possible to obtain a different displacement of the deflector 18 between its extreme positions, which makes it possible to modulate the direction of the flow of air leaving the air outlet device 1 as a function of said device's environment or particular constraints, such as the shape of the air duct 4. As an example, the air ducts 4 of FIGS. 3 to 5 comprise a throat 30 formed by the transverse walls 8 at the second fins 12 and different slot shapes have been shown.

As shown in the figures, the slot 28 extends along a path that is at least partially not parallel to the upstream-downstream direction of the duct, for example a path that is at least partially curved. According to the illustrated embodiments, these curved paths are arcs of circle, but other shapes can be considered.

Figure 4:
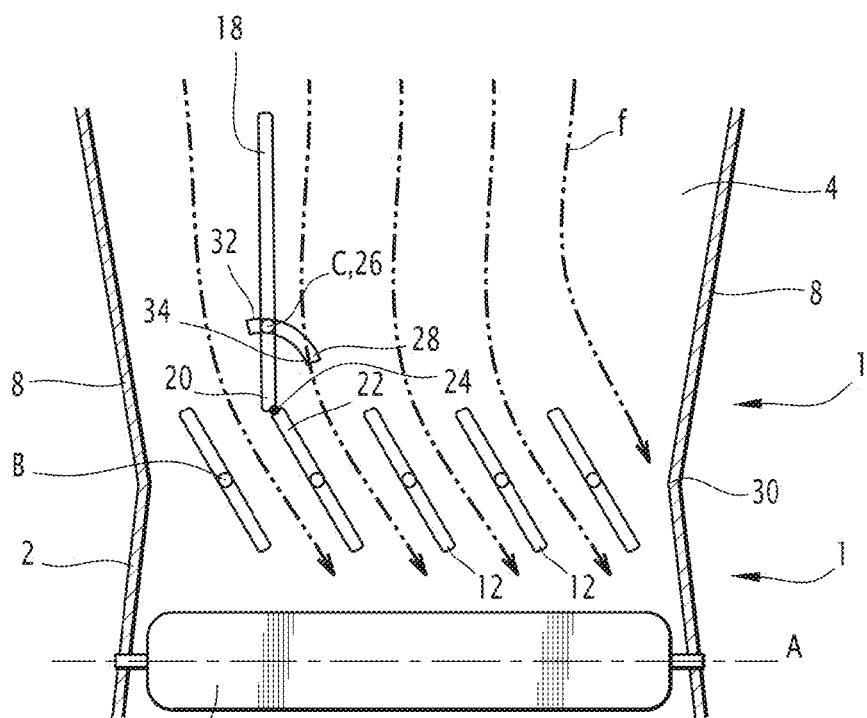
Figure 5:
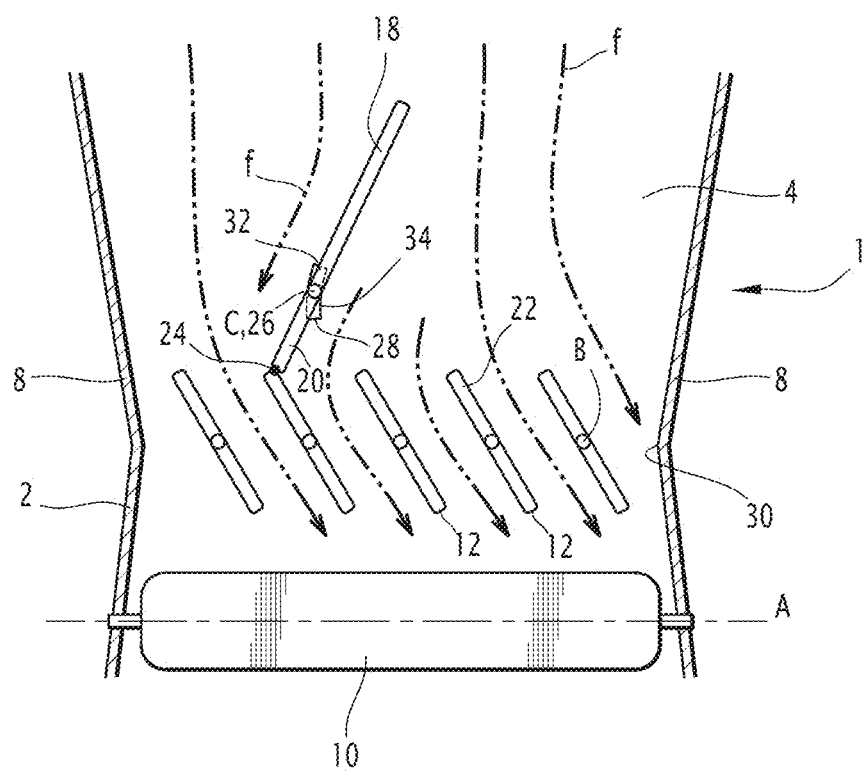

As shown in FIGS. 2, 4 and 5, the slot 28 comprises an upstream end portion 32 and a downstream end portion 34, the upstream end portion 32 extending upstream of the downstream end portion 34 relative to the upstream-downstream direction of the air duct 4. According to the embodiment shown in FIG. 3, the slot 28 has a semicircular shape whereof the end portions are arranged on a substantially longitudinal straight line.

In general, the shape of the slot 28 is arranged so that in certain positions of the second fins, the deflector 18 prevents "rebounds" of air against the transverse walls 8 because these rebounds would reorient the air in a direction different from the one desired by the user when the latter has positioned the second fins.

According to one embodiment, the slot 28 is arranged so that the upstream end portion of the deflector 18 bears against one of the transverse walls 8 in an extreme position of the second fin 12 so that the deflector 18 plugs part of the air duct 4 in this extreme position. The air is then redirected at the outlet of the air duct 4 by only some of the second fins.

Although a single deflector 18 has been described here, the air outlet device can comprise several deflectors, each being fastened to one of the second fins 12. In particular, a second deflector can be provided near the other transverse wall 8. The slots in which the axis of said second deflector is mounted can then be substantially symmetrical to the slots in which the axis of the first deflector is mounted, relative to the center of the longitudinal walls.

The device described above makes it possible to improve the directivity and orientation possibilities for the flow of air leaving the air outlet device and to adapt this device to its environment by simply modifying the movement kinematics of the deflector by changing the shape of the slot. The shape of the slot makes it possible to homogenize as a function of the deflector's position. A uniform exit speed is thus obtained at the outlet of the air duct.

Although the air outlet device 1 has been described as being used with a motor vehicle dashboard, it can also be adapted to other parts, such as a central console, a door panel, or others.

The invention claimed is:

1. An air outlet device for a motor vehicle ventilation system, comprising:
   at least one peripheral wall forming an air duct;
   at least one first fin near a downstream end of the air duct, the at least one first fin extending substantially longitudinally and being rotatably mobile around a substantially longitudinal axis;
   at least one second fin extending substantially transversely and being rotatably mobile around a substantially transverse axis; and
   at least one deflector extending substantially transversely upstream of the at least one second fin and being rotatably mobile around a substantially transverse axis of rotation, a downstream end portion of the at least one deflector being fastened to an upstream end portion of the at least one second fin via a hinge so that rotation of the at least one second fin in one direction drives rotation of the at least one deflector in an opposite direction, wherein
   the axis of rotation of the at least one deflector is slidedly movable along at least one slot of the at least one peripheral wall, said at least one slot extending along a path at least partially not parallel to an upstream-downstream direction of the air duct, and said axis of rotation is movable in rotation in said at least one slot with the at least one deflector.

2. The air outlet device according to claim 1, wherein the at least one slot follows a path that is at least partially curved.

3. The air outlet device according to claim 2, wherein the at least one slot comprises an upstream end portion and a downstream end portion, the upstream end portion extending upstream of the downstream end portion relative to the upstream-downstream direction of the air duct.

4. The air outlet device according to claim 2, wherein the at least one slot has a semicircular shape whereof the end portions are arranged on a substantially longitudinal straight line.

5. The air outlet device according to claim 1, wherein the air outlet device comprises two longitudinal peripheral walls and two transverse peripheral walls defining the air duct between them, the at least one first fin being mounted rotating between the two transverse peripheral walls, and the at least one second fin and the at least one deflector being mounted rotating between the two longitudinal peripheral walls, said two longitudinal peripheral walls each including the at least one slot in which the axis of rotation of the at least one deflector is mounted, there thus being two slots, said two slots extending opposite each other.

6. The air outlet device according to claim 1, wherein the at least one first fin comprises a plurality of first fins extending substantially longitudinally one first fin above the other first fin, said plurality of first fins being rotatably secured around the substantially longitudinal axes.

7. The air outlet device according to claim 5, wherein the at least one second fin comprises a plurality of second fins extending substantially transversely next to each other, said plurality of second fins being rotatably secured around the substantially transverse axes, the downstream end portion of the deflector being fastened to the upstream end portion of one of said second fins.

8. The air outlet device according to claim 7, wherein the downstream end portion of the deflector is fastened to the upstream end portion of a second fin of the plurality of second fins extending near one of the transverse peripheral walls.

9. The air outlet device according to claim 8, wherein a first second fin of the plurality of second fins is inserted between the transverse peripheral wall and a second second fin of the plurality of second fins whereof the upstream portion is fastened to the downstream end portion of the at least one deflector.

10. The air outlet device according to claim 5, wherein an upstream end portion of the at least one deflector is arranged to bear against one of the transverse peripheral walls in an extreme position of the at least one second fin so that the at least one deflector plugs part of the air duct in that position.

11. A motor vehicle dashboard, said dashboard comprising at least one air outlet opening, connected to a motor vehicle ventilation system, wherein an air outlet device according to claim 1 is arranged in said opening so as to control a direction of air flow leaving said ventilation system.

12. The air outlet device according to claim 2, wherein the air outlet device comprises two longitudinal peripheral walls and two transverse peripheral walls defining the air duct between them, the at least one first fin being mounted rotating between the two transverse peripheral walls, and the at least one second fin and the at least one deflector being mounted rotating between the two longitudinal peripheral walls, said two longitudinal peripheral walls each including the at least one slot in which the axis of rotation of the at least one deflector is mounted, there thus being two slots, said two slots extending opposite each other.

13. The air outlet device according to claim 2, wherein the at least one first fin comprises a plurality of first fins extending substantially longitudinally one first fin above the other first fin, said plurality of first fins being rotatably secured around the substantially longitudinal axes.

14. The air outlet device according to claim 1, wherein the at least one second fin comprises a plurality of second fins extending substantially transversely next to each other, said plurality of second fins being rotatably secured around the substantially transverse axes, the downstream end portion of the deflector being fastened to the upstream end portion of one of said second fins.

15. The air outlet device according to claim 2, wherein the at least one second fin comprises a plurality of second fins extending substantially transversely next to each other, said plurality of second fins being rotatably secured around the substantially transverse axes, the downstream end portion of the deflector being fastened to the upstream end portion of one of said second fins.

16. The air outlet device according to claim 3, wherein the air outlet device comprises two longitudinal peripheral walls and two transverse peripheral walls defining the air duct between them, the at least one first fin being mounted rotating between the two transverse peripheral walls, and the at least one second fin and the at least one deflector being mounted rotating between the two longitudinal peripheral walls, said two longitudinal peripheral walls each including the at least one slot in which the axis of rotation of the at least one deflector is mounted, there thus being two slots, said two slots extending opposite each other.

17. The air outlet device according to claim 3, wherein the at least one first fin comprises a plurality of first fins extending substantially longitudinally one first fin above the other first fin, said plurality of first fins being rotatably secured around the substantially longitudinal axes.

18. The air outlet device according to claim 3, wherein the at least one second fin comprises a plurality of second fins extending substantially transversely next to each other, said plurality of second fins being rotatably secured around the substantially transverse axes, the downstream end portion of the deflector being fastened to the upstream end portion of one of said second fins.

\* \* \* \* \*